United States Patent
Otten

(10) Patent No.: US 7,226,253 B2
(45) Date of Patent: Jun. 5, 2007

(54) CLAMPING MECHANISM

(75) Inventor: Juergen Otten, Tiste (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 10/755,049

(22) Filed: Jan. 8, 2004

(65) Prior Publication Data

US 2004/0141821 A1    Jul. 22, 2004

(30) Foreign Application Priority Data

Jan. 8, 2003    (DE) .................. 103 00 202

(51) Int. Cl.
     B23B 47/28     (2006.01)
(52) U.S. Cl. .................. 408/67; 408/75; 408/97; 408/103; 408/115 R
(58) Field of Classification Search .............. 408/67, 408/75, 97, 103, 115 R
See application file for complete search history.

(56) References Cited

U.S. PATENT DOCUMENTS

| | | | | |
|---|---|---|---|---|
| 437,047 | A * | 9/1890 | Sargent | 29/560.1 |
| 1,742,224 | A * | 1/1930 | Swartz | 269/87.3 |
| 2,108,131 | A * | 2/1938 | Lewis | 408/98 |
| 2,351,243 | A * | 6/1944 | Vetter | 408/97 |
| 2,418,956 | A * | 4/1947 | Silver | 408/97 |
| 2,466,023 | A * | 4/1949 | Griffin | 408/79 |
| 2,856,799 | A * | 10/1958 | De Curtis | 408/16 |
| 3,045,727 | A * | 7/1962 | Clarke | 269/58 |
| 3,397,600 | A * | 8/1968 | Wells | 408/112 |
| 3,674,375 | A * | 7/1972 | Reed et al. | 408/103 |
| 3,764,204 | A * | 10/1973 | Kammeraad | 408/75 |
| 4,027,992 | A * | 6/1977 | Mackey et al. | 408/97 |
| 4,145,160 | A * | 3/1979 | Wiggins | 408/103 |
| 4,601,618 | A * | 7/1986 | McEldowney | 408/1 R |
| 4,955,766 | A * | 9/1990 | Sommerfeld | 408/87 |
| 5,071,293 | A * | 12/1991 | Wells | 408/112 |
| 5,161,923 | A * | 11/1992 | Reccius | 408/72 R |
| 5,466,098 | A * | 11/1995 | Juang | 408/115 R |
| 5,733,077 | A * | 3/1998 | MacIntosh, Jr. | 408/103 |
| 5,800,099 | A * | 9/1998 | Cooper | 408/1 R |

(Continued)

FOREIGN PATENT DOCUMENTS

DE      19639122      4/1998

(Continued)

Primary Examiner—Monica Carter
Assistant Examiner—Michael W. Talbot
(74) Attorney, Agent, or Firm—W. F. Fasse; W. G. Fasse

(57) ABSTRACT

The drilling of a hole through at least two structural components in alignment with a predrilled hole or marked location in one of the structural components is facilitated by a clamping mechanism that has a bail with two legs. One leg carries a first clamping section with a guide channel for a centering pin or a drill bit. When the centering pin has served its purpose it is removed from the guide channel which then guides the drill bit. The other leg carries a second clamping section opposite the first clamping section. The second clamping section has a pressure bushing drivable by a clamping drive for clamping the second structural component against the first structural component for drilling a hole through all structural components including through a predrilled hole or for simultaneously drilling all structural components at the marked location. The pressure bushing has a hollow free end forming a cavity.

9 Claims, 6 Drawing Sheets

U.S. PATENT DOCUMENTS

| | | | |
|---|---|---|---|
| 5,853,270 A * | 12/1998 | Salley et al. ................... 408/87 |
| 5,961,258 A | 10/1999 | Ende et al. |
| 6,247,879 B1 * | 6/2001 | Costa ......................... 408/112 |
| 6,254,320 B1 * | 7/2001 | Weinstein et al. ........... 408/103 |
| 6,283,684 B1 * | 9/2001 | Jarvis ......................... 408/103 |
| 6,394,712 B1 * | 5/2002 | Weinstein et al. ........... 408/103 |
| 6,398,465 B1 * | 6/2002 | Monge ........................ 408/1 R |
| 6,413,022 B1 * | 7/2002 | Sarh ............................ 408/76 |
| 6,637,988 B1 * | 10/2003 | Park ........................... 408/103 |
| 6,729,809 B2 * | 5/2004 | Sarh et al. ................... 408/1 R |
| 2002/0104207 A1 * | 8/2002 | Smith et al. ................. 29/26 A |
| 2004/0175244 A1 * | 9/2004 | Otten .......................... 408/130 |
| 2005/0105979 A1 * | 5/2005 | Snider et al. ............ 408/115 R |

FOREIGN PATENT DOCUMENTS

| | | | |
|---|---|---|---|
| DE | 19945097 | | 3/2001 |
| GB | 2120584 A | * | 12/1983 |
| GB | 2288356 A | * | 10/1995 |

\* cited by examiner

CLAMPING MECHANISM

PRIORITY CLAIM

This application is based on and claims the priority under 35 U.S.C. §119 of German Patent Application 103 00 202.2, filed on Jan. 8, 2003, the entire disclosure of which is incorporated herein by reference.

FIELD OF THE INVENTION

The invention relates to a mechanism for clamping at least two structural components to each other to hold these components in a proper position relative to each other for performing work on these components, for example drilling holes.

BACKGROUND INFORMATION

In connection with the production, for example, of aircraft structural components a multitude of riveted connections are required, for example for connecting a cross girder or spar to a rib of an aircraft fuselage component. A respective multitude of holes must be drilled through these components for the riveted connections. Conventionally, one of the components to be connected with another component is provided with predrilled holes and these predrilled holes are used as a template for drilling corresponding holes into one or more further components.

Manually held power tools such as electric drills pose a problem, particularly in connection with the assembly operation of structural components having a large volume such as an aircraft fuselage, because these tools must not only be held in different working locations, the tools must also be held in precise positions so that, for example, drilled holes are accurately aligned with each other for the riveting operation. Nonaligned holes prevent the insertion of a rivet. The problem is magnified when the working locations are hard to access and/or when the power tools or machining tools are of substantial weight and still must be handheld and guided into the proper position. Thus, for example the structural assembly of an aircraft fuselage requires the performance of clamping, drilling and riveting in positions that require the assembly worker to assume different working positions, whereby the assembly worker must exert him or herself in handling these power tools, particularly when the power tools are heavy. Thus, in ergonomic terms, work of this type frequently reaches the limits of human capacity. Furthermore, in connection with such assembly operations a plurality of steps must be performed. These steps are freely conducted and are strength consuming. Such steps involve following the predrilling, the disconnection of the structural components, a deburring of the drilled holes, the application of caulking and then realigning the structural components, temporarily securing the components to each other and finish drilling the components. All these steps are quite time consuming and leave room for improvement, particularly with regard to optimizing these working steps in an ergonomic sense.

German Patent Publication DE 196 39 122, corresponding to U.S. Pat. No. 5,961,258 discloses an apparatus for clamping and drilling. The known apparatus comprises a base body carrying a clamping member and a drill section. The clamping member comprises a clamping bail which is movable together with a clamping element axially and against the feed advance direction from an open starting position into a clamping position. The drill section comprises a power drill and is operatively connected with the clamping member through a clamping piston cylinder device. Following the positioning of a drill bit tip in a predrilled hole, a starting button is pressed, whereby the components are automatically clamped to each other and the drilling operation is started. In many situations the working space is not available for the apparatus that combines the functions of clamping and drilling. As a result, the known clamping drilling machine cannot be properly positioned and hence cannot be used or its use becomes very difficult for the worker.

OBJECTS OF THE INVENTION

In view of the foregoing it is the aim of the invention to achieve the following objects singly or in combination:

- to provide a clamping mechanism which can be used ergonomically even in a confined work space that is hard to access;
- to construct the clamping mechanism in such a way that it can clamp simultaneously at least two work pieces relative to one another; and
- to facilitate the handling of the tools, particularly power tools, for the worker even in different and difficult working positions.

SUMMARY OF THE INVENTION

The above objects have been achieved according to the invention by a clamping mechanism for clamping at least two structural components to each other by a clamping bail that forms a clamping opening and carries a first clamping section and a second clamping section which face each other across the clamping opening. The clamping sections are axially aligned with each other. The first clamping section has a guide element such as a guide channel for guiding a drill bit after a removable centering pin which is axially movable in the guide element for aiding and positioning a first structural component. The centering pin may also be a marker that is axially movable in the guide element. The second clamping section has a pressure member such as a bushing and a clamping drive for pressing the pressure member against the second structural component and thus against the first structural component to establish a clamped position for at least two structural components such as aircraft fuselage components. The clamping bail in cooperation with its components or sections forms a jig.

It is an advantage of the jig according to the invention that it permits to effectively and simply clamp and simultaneously position at least two structural components relative to each other. The exact positioning relative to a predrilled hole or a marked drilling position is achieved with a simple jig construction. The clamping capability is combined with a centering capability and with a support into which a power drill is easily inserted and removed, thereby making the work easier for the assembly worker. By separating the clamping and alignment feature from the supporting feature for the power drill the present jig can be readily used in confined work positions, for example in the assembly within an aircraft fuselage structure. The support for the power drill is constructed so that for different purposes different power drills may be used with the same jig. Thus, the usefulness of the present jig has been increased compared to conventional jigs, particularly in connection with the assembly procedure within a large volume structural component such as an aircraft fuselage or wing. The present jig is easily movable from drilling location to drilling location so that a multitude of holes can be drilled, thereby reducing the assembly costs.

The guide element is preferably a bushing or guide channel that is so constructed that the centering pin is either easily removable from the bushing or guide channel when the clamping is completed and the drilling can begin or it can be at least moved out of the way for the insertion of the drill bit into the guide channel or guide bushing. In this alternative embodiment the centering or locating pin has a longitudinal axis extending at an angle to a drilling axis of the drill bit.

Several different possibilities for supporting the power drill in alignment with the guide bushing can be achieved by a conventional interlocking mechanism or a conventional clamping chuck that forms a support for a power drill.

Various, different clamping drives may be employed for pressing the pressure member against a structural component for the clamping operation. In a preferred embodiment a suction hose or pipe is connected to the guide bushing or guide channel for removing drilling chips.

BRIEF DESCRIPTION OF THE DRAWINGS

In order that the invention may be clearly understood, it will now be described in connection with example embodiments thereof, with reference to the accompanying drawings, wherein.

DETAILED DESCRIPTION OF A PREFERRED EXAMPLE EMBODIMENT AND OF THE BEST MODE OF THE INVENTION

Figure 1:
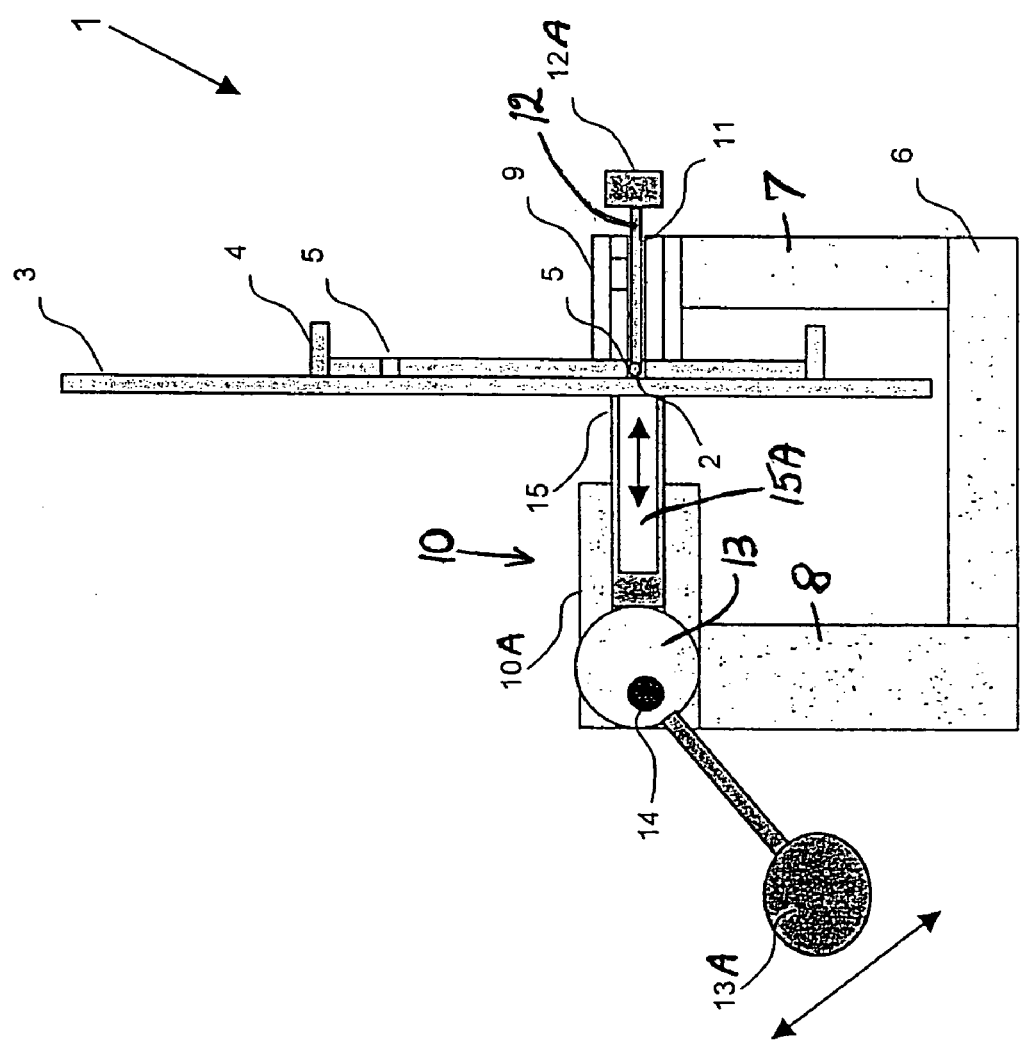
FIG. 1 is a schematic side view of a first embodiment of the clamping mechanism according to the invention.

FIG. 1 shows a schematic side view of the present clamping mechanism for use in combination with handheld tools such as a power drill or similar tools that are used in the assembly of structural components 3, 4. For example a spar 3 is connected with a rib 4 of an aircraft fuselage by riveting which requires the drilling of rivet holes 5 at marked work locations 2 which may be predrilled holes in one of the two components 4, 3.

The predrilled holes or marked work locations 2 must be accurately aligned with a drill bit DB so that the holes to be drilled through two or more structural components simultaneously are also properly aligned for the riveting operation which requires a snug fit of the rivet shank through the drilled rivet holes. If the rivet holes are not properly aligned with each other it becomes impossible to properly insert a rivet into the rivet holes. To avoid this problem the rivet holes must initially be drilled with the two or more structural components properly held together during the drilling operation. Preferably, the predrilled holes in one structural component are used as a template for drilling the respective holes in the other structural component.

Further, it is necessary to avoid the entrance of drilling chips between two neighboring structural components and to avoid the formation of burrs along the edges of the drilled holes. The present clamping mechanism 1 achieves these objects with a clamping bail 6 having a first bail leg 7 and a second bail leg 8. The first bail leg 7 carries a first clamping section 9. The second bail leg 6B carries a second clamping section 10. The clamping sections 9 and 10 are axially aligned with each other and leave a clamping space between each other for insertion of at least two structural components 3 and 4 to be clamped for drilling through a predrilled hole 5 or through a premarked location 2. In order to properly align the predrilled hole 5 with a drill bit DB, shown in FIG. 2, the first clamping section 9 comprises a guide bushing including a guide channel 11 that is mounted in or formed in the first clamping section for receiving a removable centering pin 12 which can be inserted into and removed from the guide channel 11 by the pin handle 12A. When the tip of the pin enters into a predrilled hole 5 or engages a premarked location 2 in the component 4, the required alignment is assured. The components 3, 4 are now clamped, the centering pin 12 removed and the drill bit DB is inserted into the guide channel 11 for drilling through all clamped components. The centering pin 12 may be secured to the bail 6 by a chain or the like to avoid losing the pin 12.

The clamping is performed by the elements of the second clamping section 10 having a housing 10A with a bore in which a pressure application member 15 is axially movable in alignment with a central longitudinal axis of the guide channel 11 in the first clamping section 9. This central longitudinal axis is the drilling axis along which the drill bit DB is advanced. Preferably the pressure member 15 has a central coaxial dead end cavity 15A that opens toward the component 3 to permit entry of the drill bit DB tip into the cavity 15A when the drilling of the hole through all components 3, 4 is completed. Drilling chips that may be pushed out of the drilled hole by the drill bit will be collected in the cavity 15A which is preferably connected to a suction hose or pipe, not shown, for removing any drilling chips from the cavity 15A.

The pressure application member 15 is movable back and forth in the bore of the housing 10A as indicated by the double arrow. The member 15 moves to the right in FIG. 1 for applying a clamping pressure to the components 3, 4 in response to operating a clamping drive cam 13 drivable by a drive lever 13A. The drive cam 13 is mounted eccentrically on a shaft 14 in the housing 10A. The construction may be such that the drive cam 13 moves the pressure member 15 in both directions as indicated by the double arrow depending on the motion direction of the lever 13A. However, a return of the pressure member 15 out of the clamping position, to the left in FIG. 1, may be alternatively accomplished by a biasing spring not shown. The clamping bail 6 makes sure that the first clamping section 9 which is rigidly secured to the top of the first bail leg 7, takes up the clamping force applied by the pressure member 15 directly around the hole being drilled. Preferably, guide channel 11 which also functions as a drill bit guide bushing, takes up the clamping force to concentrate the clamping force around the holes being drilled simultaneously to avoid forming burrs around the drilled hole edges.

Figure 2:
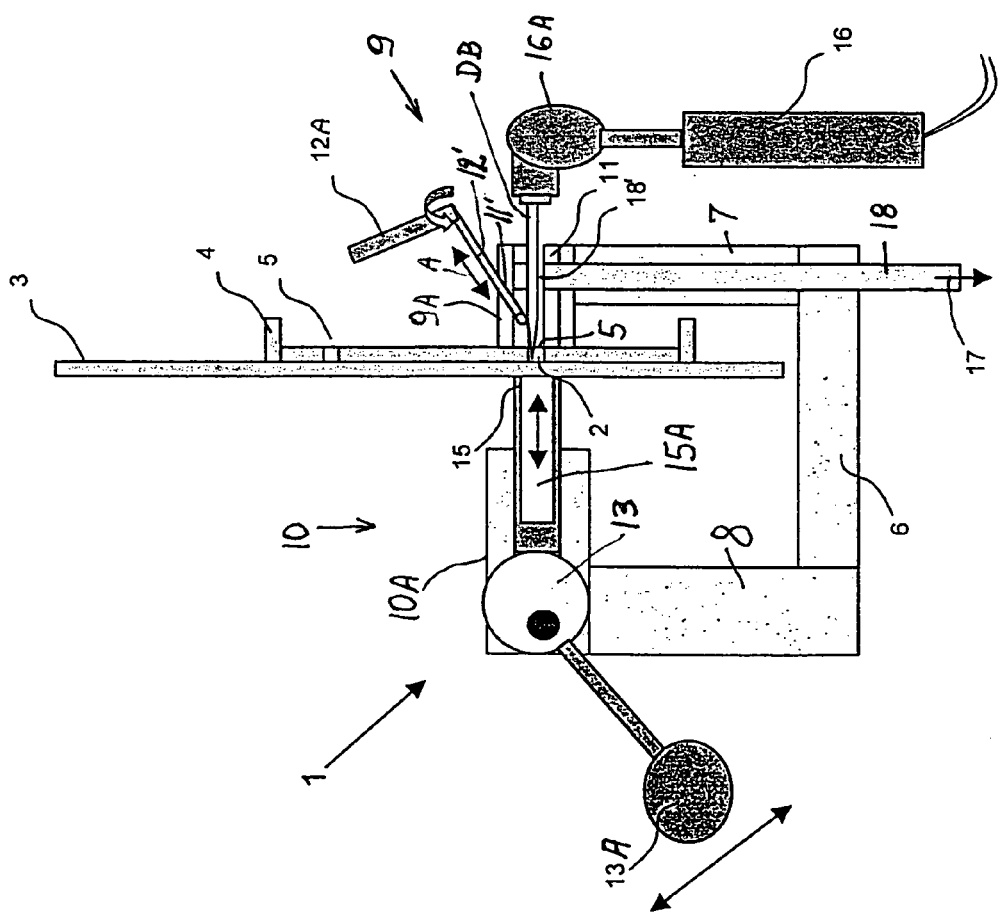
FIG. 2 shows a mechanism similar to that of FIG. 1 cooperating with a handheld power drill driving a drill bit along a drilling axis and with a locating pin movable along a pin axis at an angle to the drilling axis.

FIG. 2 shows a clamping mechanism which has been modified compared to FIG. 1. The clamping mechanism cooperates with a power driven drill or drilling tool 16 equipped with an angle chuck 16A that drives the drill bit DB guided by the guide channel 11 into the marked position 2 or into the predrilled hole 5. For this purpose a locating pin 12' has been moved out of a separate guide hole 11' to the extent necessary. The locating pin 12' is, for example, equipped with an outer threading that cooperates with a threading in the guide hole 11' in the portion 9A of the clamping section 9 for a back and forth movement as shown by arrow A. The threaded hole 11' for the locating pin 12' has a pin axis extending at an angle to the drilling axis as shown in FIGS. 2, 3, 4, 5 and 6. By rotating the locating pin 12' with its handle 12A the tip of the locating pin 12' can be moved out of the guide channel 11 to the extent necessary for the entrance and movement of the drill bit DB in the guide channel 11. Initially, the locating pin 12' is rotated as shown by the rotation arrow to move the tip of the locating pin 12' into engagement with the predrilled hole 5 or with the marked location 2. Once the clamping with the clamping drive lever 13A is completed, the locating pin 12' is rotated in the opposite direction out of the guide channel 11 but remains in its own guide hole 11' and the drill bit DB can be inserted into the guide channel 11. When the drilling is completed, the drill bit DB is withdrawn by moving the handheld power drill 16 away from the clamping mechanism 1. The clamping drive lever 13A is now moved in the opposite direction to release the clamping mechanism 1 from the components 3 and 4 for repositioning relative to another predrilled hole 5 and repetition of the work step sequence. It should be mentioned here, that the clamping drive with the cam 13 is self-locking so that a clamped position can only be released by operating of the clamping drive lever 13A.

FIG. 2 shows a suction pipe or hose 18 that ends with a suction port 18' in the guide channel 11 for applying suction 17 to the guide channel for removing drilling chips from the guide channel 11. The suction is applied during the drilling to assure a complete removal of any drilling chips to thereby provide a clean drilled hole for the subsequent riveting operation. A similar suction device not shown can be connected to the cavity 15A preferably in the form of a flexible hose that can move back and forth with the clamping motion and release motion of the pressure application member 15. A complete chip removal is particularly important in connection with structural components of composite material or of titanium in order to not only achieve properly clean drilled holes, but also to satisfy worker protection requirements. Rather than opening the suction pipe or hose 18 at the suction port 18' in the guide channel 11, it is also possible to secure a suction opening to the right hand open side of the guide channel 11.

Figure 3:
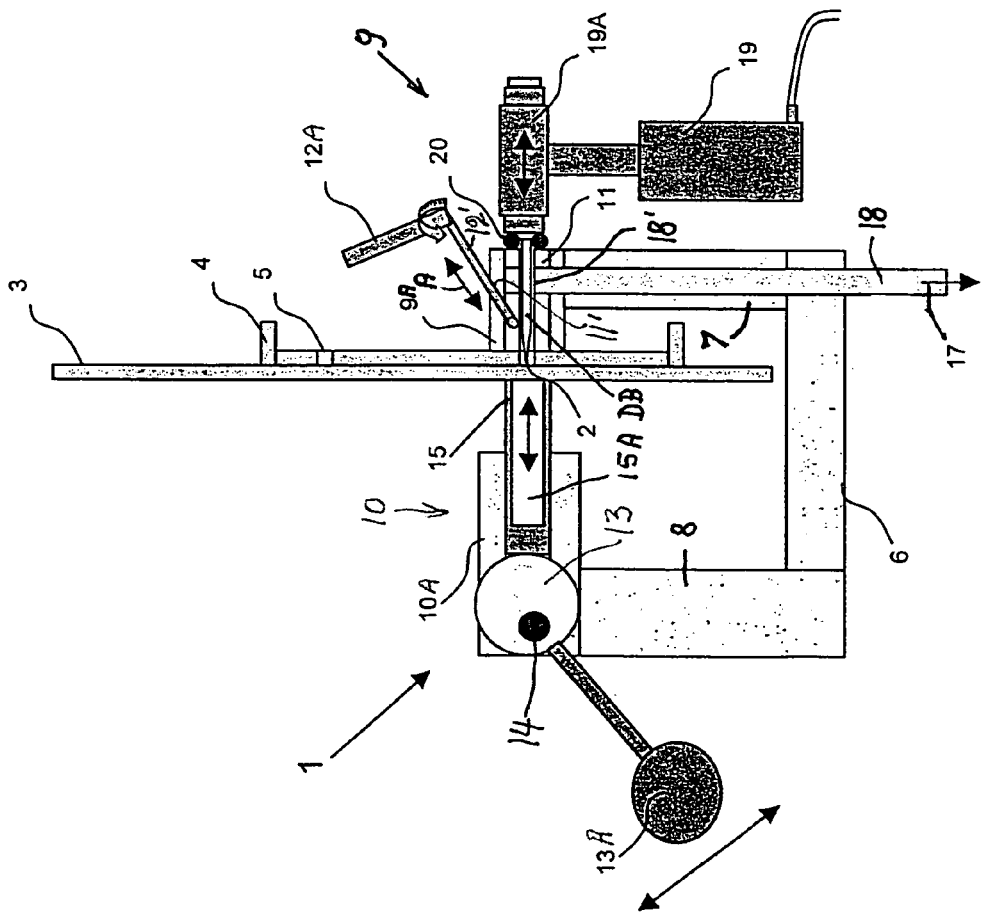
FIG. 3 shows the clamping mechanism of FIG. 2 cooperating with a power drill and a drilling feed advance unit.

FIG. 3 illustrates the combination of a clamping mechanism 1 as shown in FIGS. 1 and 2 in cooperation with a pneumatically driven tool 19 having a tool head 19A for driving a drill bit DB. The tool head 19A provides an automatic feed advance of the drill bit DB as is conventional. In order to assure a precise positioning of the tool 19 with its head 19A relative to the guide channel 11 an adapter 20 is positioned next to the entrance of the guide channel 11. The adapter 20 can be used alone as a guide element or it may be combined with the guide channel 11 as shown in FIG. 3. When the adapter 20 is used alone, it takes over the function of the guide channel 11 and a coupling function to secure the tool head 19A in an aligned position relative to the first clamping section 9 to which the adapter 20 would be connected if there is no guide channel 11. Any conventional chucking mechanism can be used to work as the adapter 20. Conventional clamping mechanisms, locking mechanisms, or circular wedge chucks may be used. The latter are, for example disclosed in German Patent Publication DE 199 45 097 A1. FIG. 3 also shows a seperate guide hole 11' for the locating pin 12' which extends at an angle to the guide channel 11 for the drill bit DB.

Figure 4:
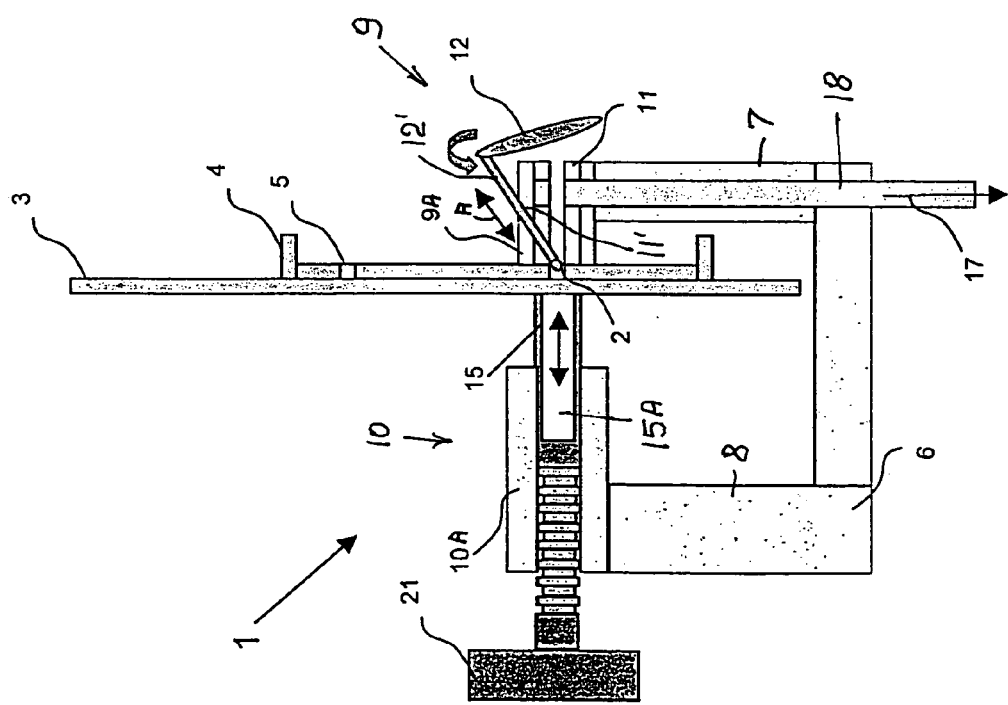
FIG. 4 shows a modified embodiment with a clamping screw instead of a clamping cam.

FIG. 4 illustrates an embodiment in which the second clamping section 10 is equipped with a clamping screw 21 that can move the pressure member 15 against the components 3, 4 to be clamped. The pressure member 15 is preferably an integral part of the clamping screw 21 and is also equipped with a cavity 15A as described above. The clamping screw 21 has the advantage that the clamping force can be exactly selected or dosed. In FIG. 4 the locating pin 12' also extends at an angle to the guide channel 11 for the drill bit DB.

Figure 5:
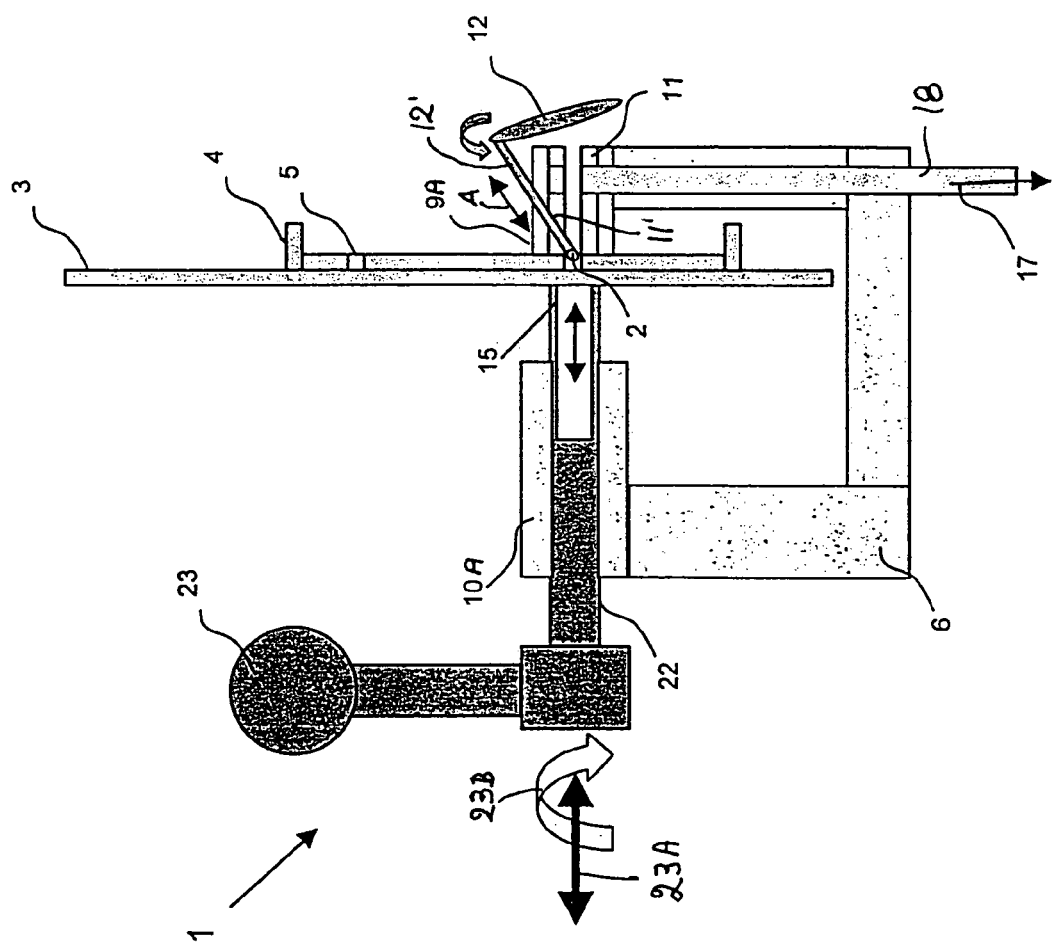
FIG. 5 shows a modified embodiment with a clamping push rod.

FIG. 5 illustrates an embodiment in which the clamping force is applied by a push rod 22 slidably mounted in the housing 10A and operable by a lever 23 as indicated by the arrows 23A and 23B. When the push rod 22 is moved either back or forth as indicated by the double arrow 23A, locking pins, not shown, are disengaged from respective notches. When the push rod 22 is rotated as indicated by the arrow 23B at least one locking pin is engaged with a respective notch to hold the pressure member 15 in a clamping position as described above. Here again, the pressure member 15 is preferably an integral part of the push rod 22. Just as with the other embodiments an assembly worker can operate the clamping mechanism of FIG. 5 with one hand. These pressure application mechanisms with a push rod are known under the Trade name RAKO and are manufactured by the Firm DE-SAT-CO. In FIG. 5 the locating pin 12' also extends at an angle to the guide channel 11 for the drill bit DB.

Figure 6:
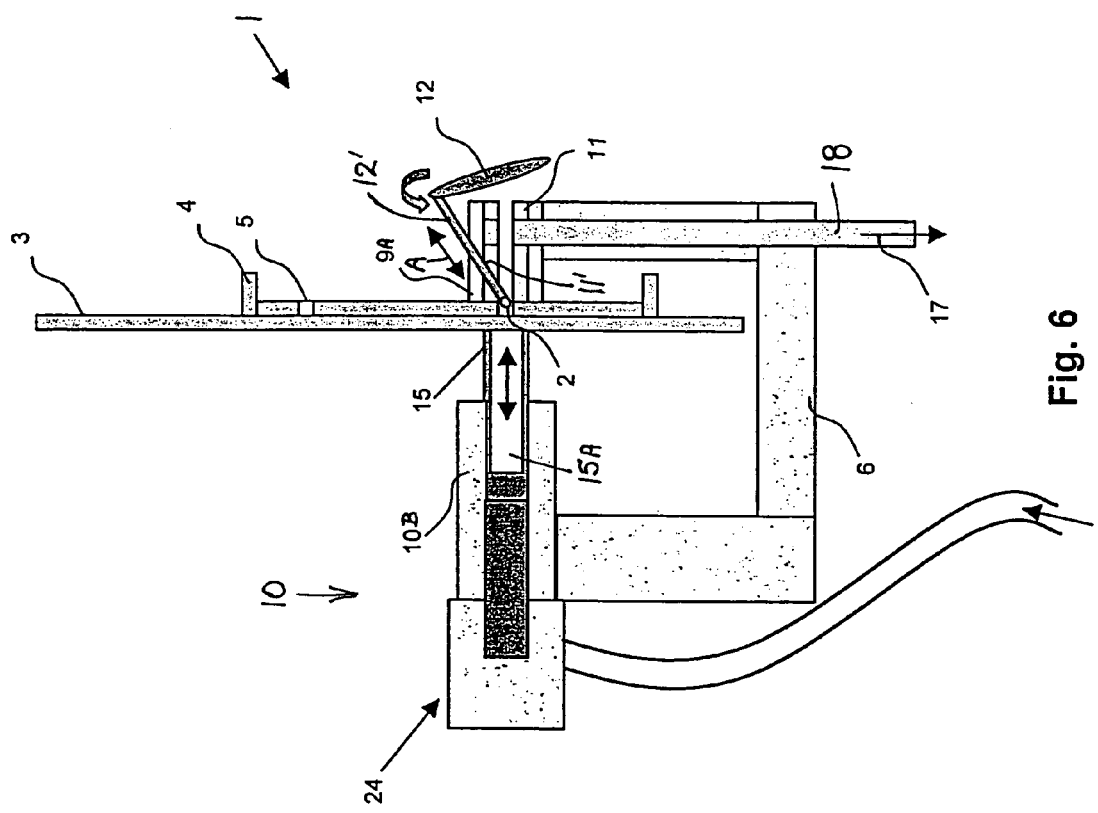
FIG. 6 shows an embodiment with a clamping piston cylinder device.

In FIG. 6 the second clamping section 10 is equipped with a piston cylinder device 24 that is preferably operated by pneumatic pressure. However, hydraulic pressure may also be employed for moving the pressure member 15 into the clamping position. In this embodiment the pressure member 15 forms part of the piston inside the cylinder formed by the housing 10B which is connected to a pressure supply line. Otherwise, the structure and function is the same as described above. Preferably, the pressure member 15 with its cavity 15A is an integral part of the piston in the cylinder or housing 10B. In FIG. 6 the locating pin 12' also extends at an angle to the guide channel 11 for the drill bit DB.

Applying the clamping pressure around the hole to be drilled results in drilled hole edges which are free of burrs in all embodiments.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A clamping mechanism for clamping at least two structural components to each other, said clamping mechanism comprising a clamping bail forming a clamping opening, a first clamping section (9) carried by said clamping bail to face across said clamping opening, a second clamping section (10) carried by said clamping bail to face across said clamping opening in axial alignment with said first clamping section (9), said axial alignment defining a drilling axis, said first clamping section (9) comprising a guide element with a guide channel (11) adapted to guide a drill bit (DB) driven by a drilling tool along said drilling axis, a guide hole (11) in said guide element, a locating pin (12) movable in said guide hole (11') along a pin axis extending at an angle to said drilling axis, said locating pin (12') being axially movable along said guide hole (11') in said guide element to reach into said guide channel (11) for positioning a first structural component of said at least two structural components in a correct drilling position, said locating pin (12') being also sufficiently moveable for moving out of said guide channel (11) and wherein said second clamping section (10) comprises a pressure member (15) and a clamping drive for pressing said pressure member (15) against a second structural component of said at least two structural components and against said first structural component to establish a clamped position for said at least two structural components.

2. The clamping mechanism of claim 1, wherein said guide element (11) comprises an adapter (20) secured to said first clamping section (9), in axial alignment with said drilling axis, said adapter comprising a locking device for locking said drilling tool to said first clamping section.

3. The clamping mechanism of claim 2, wherein said locking device of said adapter (20) is a chuck for locking said drilling tool to said first clamping section (9).

4. The clamping mechanism of claim 1, wherein said clamping drive comprises a cam (13A), an eccentric mounting (14) rotatably securing said cam (13A) to said second clamping section (10) and a drive lever (13) secured to said cam for rotating said cam against said pressure member (15).

5. The clamping mechanism of claim 1, wherein said clamping drive comprises a clamping screw (21) rotatably mounted in said second clamping section, said clamping screw having a free end forming said pressure member (15).

6. The clamping mechanism of claim 1, wherein said clamping drive comprises a clamping push rod (22) slidably and rotatably mounted in said second clamping section and an operating lever (23) secured to one end of said clamping push rod, said clamping push rod having a free end forming said pressure member (15).

7. The clamping mechanism of claim 1, wherein said clamping drive comprises a piston cylinder device mounted to said second clamping section, said piston cylinder device comprising a piston having a free end forming said pressure member (15).

8. The clamping mechanism of claim 1, further comprising a suction device (17) communicating with said guide element (11) for sucking drill chips out of said guide element.

9. The clamping mechanism of claim 1, wherein said pressure member (15) comprises a free end for contacting said other structural component and a dead end bore or cavity (15A) in said pressure member in axial alignment said guide element (11), said dead end bore opening into said free end of the pressure member wherein said free end of the pressure member, in a clamping position surrounds a structural component area through which a hole is being drilled and a drill bit tip can enter into said bore or cavity (15A) when a hole drilling is completed.

* * * * *

UNITED STATES PATENT AND TRADEMARK OFFICE
CERTIFICATE OF CORRECTION

PATENT NO. : 7,226,253 B2  Page 1 of 1
APPLICATION NO. : 10/755049
DATED : June 5, 2007
INVENTOR(S) : Otten It is certified that error appears in the above-identified patent and that said Letters Patent is hereby corrected as shown below:

Column 4,
Line 7, after "bail leg", replace "6B" by --8--;

Column 6,
Line 64, after "hole", replace "(11)" by --(11')--;
Line 65, after "pin", replace "(12)" by --(12')--;

Column 8,
Line 20, after "alignment", insert --with--.

Signed and Sealed this

Twenty-fourth Day of June, 2008

JON W. DUDAS
*Director of the United States Patent and Trademark Office*